Oct. 12, 1965  O. KAUP ETAL  3,211,106
HYDRAULIC ENERGY CONVERTER
Filed Dec. 22, 1960  3 Sheets-Sheet 1

Inventors:
Otmar Kaup and
Franz Forster,
By Pierce, Scheffler & Parker
their Attorneys Oct. 12, 1965     O. KAUP ETAL     3,211,106
HYDRAULIC ENERGY CONVERTER
Filed Dec. 22, 1960     3 Sheets-Sheet 3

INVENTORS
OTMAR KAUP
FRANZ FORSTER

BY *Pierce, Schifflin & Parker*

*their* ATTORNEYS

United States Patent Office 3,211,106
Patented Oct. 12, 1965

3,211,106
HYDRAULIC ENERGY CONVERTER
Otmar Kaup, Aschaffenburg, and Franz Forster, Glattbach, near Aschaffenburg, Germany, assignors to Gesellschaft fur Linde's Eismaschinen Aktiengesellschaft, Hollriegelskreuth, near Munich, Germany, a company of Germany
Filed Dec. 22, 1960, Ser. No. 77,667
Claims priority, application Germany, Oct. 6, 1959, G 28,096
1 Claim. (Cl. 103—162)

This application is a continuation-in-part of our application Ser. No. 49,898 filed August 16, 1960, now Patent No. 3,107,491, entitled "Improved Hydraulic Torque Converter."

This invention relates generally to a hydraulic energy converter, and more particularly to a hydraulic energy converter having first means for converting mechanical energy to hydraulic energy and second means for converting the hydraulic energy to mechanical energy, said first and said second energy converting means being mounted with in a unitary casing containing hydraulic fluid and serving as a reserve tank therefor.

Hydraulic energy converters utilizing mechanical-to-hydraulic and hydraulic-to-mechanical energy converters are, of course, well known in the prior art. By suitable control of the mechanical-to-hydraulic energy concerting means (i.e., the "pump") and/or by control of the hydraulic-to-mechanical energy converting means (i.e., the "motor"), transfer of energy may be achieved which is less complicated, requires less space, and provides a greater range of speed regulation than the purely mechanical energy converters.

The primary object of the present invention is to provide an improved hydraulic energy converter for power transmission use in land and water vehicles, farm machinery, construction and industrial apparatus, and the like. The invention is characterized by mounting the mechanical-to-hydraulic and the hydraulic-to-mechanical energy converters in a single casing which contains the hydraulic fluid and which acts as a reserve tank therefor. The valve block, oil filter, and hydrostatic control means are similarly mounted on or within the casing whereby fluid transmission lines are eliminated, the losses of hydraulic fluid transmission energy are reduced, and the efficiency of the converter is increased. As a result of the greater range of regulation of improved hydraulic energy converter, particularly when used in connection with an internal combustion engine drive means, the capacity of the drive means can be utilized to its highest extent so that a powerful and economical operation is achieved, particularly when used in applications where frequent changes of the driven resistance and driven direction occur. In order that the hydraulic energy converter might be used in many diverse applications, one or more speed-changing gearing stages may mounted upon the casing for stepping up or down the rotational speed of the energy converter output shaft. Thus the mass-produced hydraulic energy converter may be readily adapted for use with internal combustion engines ranging from the sturdy one- or two-cycle slow-operating diesel engines to the highly specialized very light Otto-motor high-speed engines. In order to disispate the heat which is developed by the hydraulic energy conversion, the hydraulic fluid in the casing may be cooled in several ways, as for example, by evaporative cooling of the unitary casing, by the provision of cooling pipes directed through the interior of the casing, by fin means, or by means of air currents produced by ventilation or fan means connected to the input shaft of the torque converter. Furthermore, the coolant, heated by heat transfer from the hydraulic fluid, may be advantageously used further for heating purposes.

Another object of the invention resides in the provision of means for automatically controlling the operation of the hydraulic converter in accordance with the loading on the output shaft thereof as well as in accordance with the power supplied to the input shaft thereof in order that the converter will operate at maximum efficiency without reducing the rotational speed (and power capacity) of the driving engine means. Simultaneously, the control device may be automatically operable to operate the drive engine at operating conditions of the lowest consumption of fuel when the machine's highest output is not required.

Other objects and advantages of the present invention will become more apparent from a study of the following specification when considered in conjunction with the accompanying drawings in which.

Figure 1:
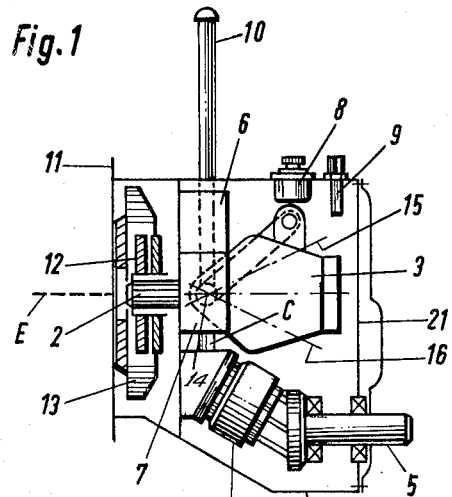
FIG. 1 is a diagrammatic sectional view of the hydraulic energy converter.

Referring first more particularly to FIG. 1 of the drawings, the hydraulic energy converter — which is particularly suitable for use as the transmission means in a maritime vessel, for example — has a unitary casing 1 provided at one end with a flange 11 by means of which the casing is secured to the crank case of an internal combustion engine, not shown. The converter includes an input or driving shaft 2 which rotatably drives the variable-capacity control pump 3 whereby the rotational mechanical input energy is converted into hydraulic energy. The pump 3 supplies hydraulic fluid to the hydraulic motor 4 through conduit C, which motor is driven by the fluid to convert the hydraulic energy into mechanical energy to drive the output or driven shaft 5 journalled in fixed bearings in the casing. The casing 1, which constitutes a receptacle for the hydraulic fluid, is provided with an oil filter 8 and an air filter 9.

The motor 4 and the variable capacity pump 3 are both preferably supported by the supporting block 7, as well as the valve block 6 which includes known hydrostatic switching or control means.

The position of control pump 3—which is pivotally connected to supporting block 7 by means of horizontal shaft 14—may be adjusted by means of lever 10 to progressively vary the capacity of the pump in either direction from zero to the full capacity positions 15 and 16 shown by the broken lines for forward and reverse drive, respectively. Of course, the control pump 3 may be mounted in said casing 1 for pivotal movement about a vertical axis, whereby counter-balancing against the weight of the pump is not required.

The operation of the hydraulic energy converter may now be briefly described.

Rotational mechanical energy from the output shaft E of the internal combustion engine is transmitted to input shaft 2 through the elastic coupling means 12. The means for driving the input shaft 2 may include, in a known manner, cooling or ventilating means show schematically by the reference numeral 13 in FIG. 1 for blowing cooling air cross the casing 1, or for driving other types of known cooling means to cool either the casing 1 or the hydraulic fluid contained therein.

Rotation of shaft 2 will drive variable-capacity pump 3 to force hydraulic fluid—at a rate and direction selected by the position of lever 10—contained in the housing 1 through conduit C to rotatably drive the hydraulic motor 4 and output shaft 5. Depending on the position of lever 10 (and the resulting pivotal position of variable-capacity control pump 3 in housing 1), the output shaft 5 will be driven either in the forward or in the reverse direction.

As is apparent in FIG. 1, the driven or output shaft 5 advantageously lies at an elevation lower than that of the drive shaft 2 so that when the converter apparatus is used in marine applications, the propeller shaft does not have to be directed downwardly at an oblique angle as is the case in known ship transmission means. While the axis of the driven shaft 5 has been illustrated as being parallel to the drive shaft 2, it could readily be arranged at an angle thereto merely by substituting only simple constructional elements, such as the supporting block 7 and the various parts of the casing 1.

Figure 2:
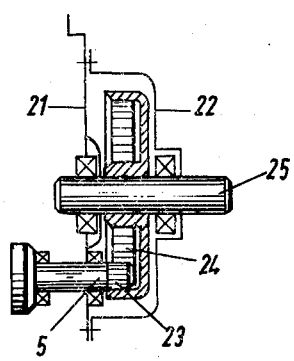
FIGS. 2 and 3 illustrate speed-changing gear means for reducing or increasing the converter output shaft rotational speed.
Figure 3:
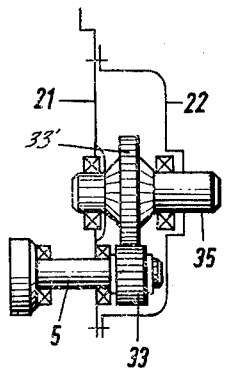

Referring now to FIG. 2, the output shaft speed of the hydraulic energy converter may be stepped down (or up) as desired by pinion and follower gearing means secured to the rear portion 21 of the casing 1. Pinion 23 on driven shaft 5 is in meshing engagement with ring follower gear 24 on the driven shaft 25, which shaft 25 is journalled in fixed bearing means within the cover 22, whereby the rotational speed of driven shaft 5 is stepped down as desired. Similarly, in FIG. 3, pinion gear means 33, 33' may be provided for stepping down the rotational speed of driven shaft 5 to the output shaft 35.

Figure 4:
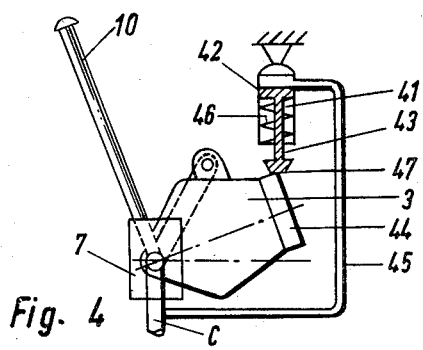
FIG. 4 is a diagrammatic illustration of fluid-pressure responsive means for automatically adjusting the capacity of the control pump to fully utilize the capacity of the internal combustion engine.

FIG. 4 discloses a discharge-pressure-controlled delivery volumeter for controlling the operation of pump 3 to utilize the full capacity of the internal combustion engine. Fluid in the conduit C is conducted through conduit 45 to the chamber above piston 42 in the cylinder 41 to move the piston downwardly against the biasing force of spring 46. The lower part 47 of piston 42 projects from the cylinder 41 and constitutes a projection or step for limiting the extent of pivotal movement of the variable-capacity pump 3. When the pressure in conduit C increases, due to an increase in speed of the internal combustion engine or to a reduction in loading on the ship's propeller, piston 42 and projection 47 will be moved downwardly to automatically limit (i.e., reduce) the capacity of the pump 3, and when the pressure in conduit C decreases, the piston 42 is moved upwardly by spring 46 to permit pump 3 to be pivoted upwardly to increase the capacity thereof. Thus the position of stop 47 is automatically adjusted as a function of the speed of operation of the internal combustion engine or of the loading (speed of rotation) of the ship's propeller to automatically vary the capacity of the pump 3 and thus utilize the full capacity of the internal combustion engine.

Figure 5:
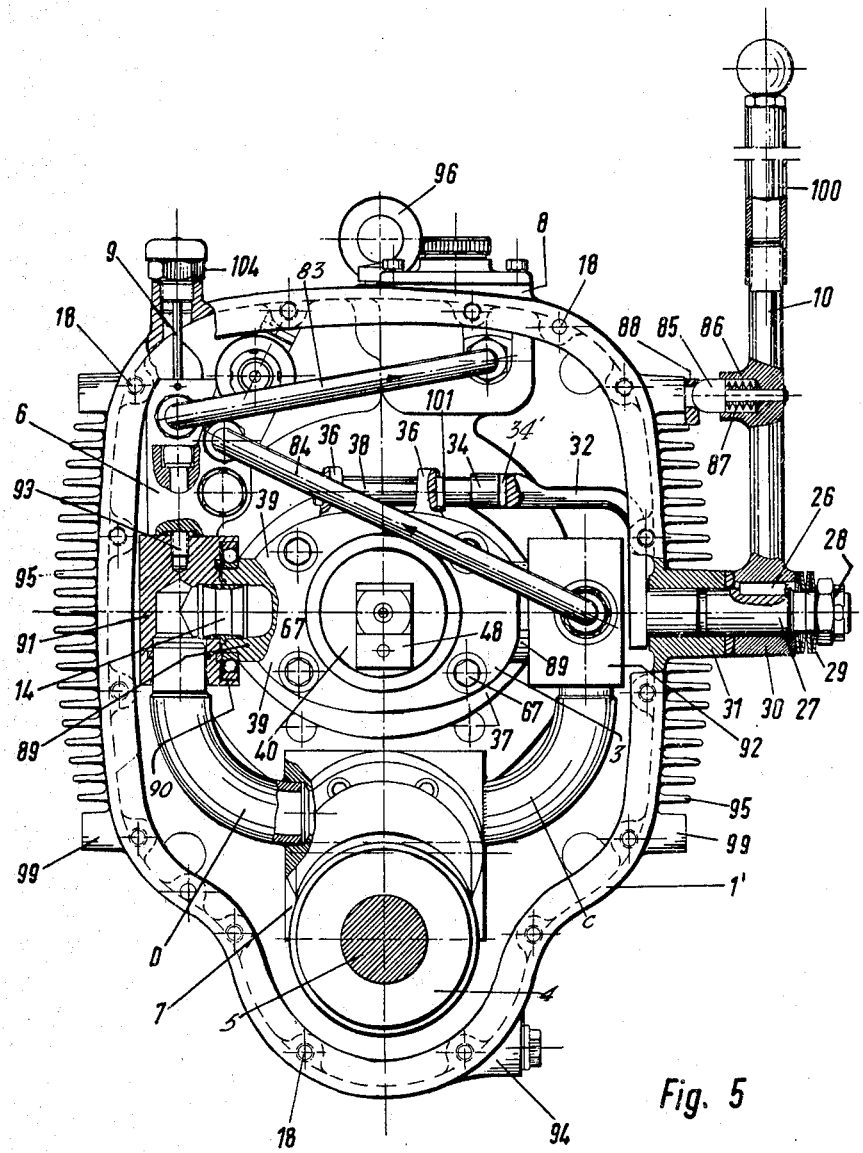
FIG. 5 represents a transmission according to the present invention, as viewed from the delivery shaft side and with the gear cover removed.
Figure 6:
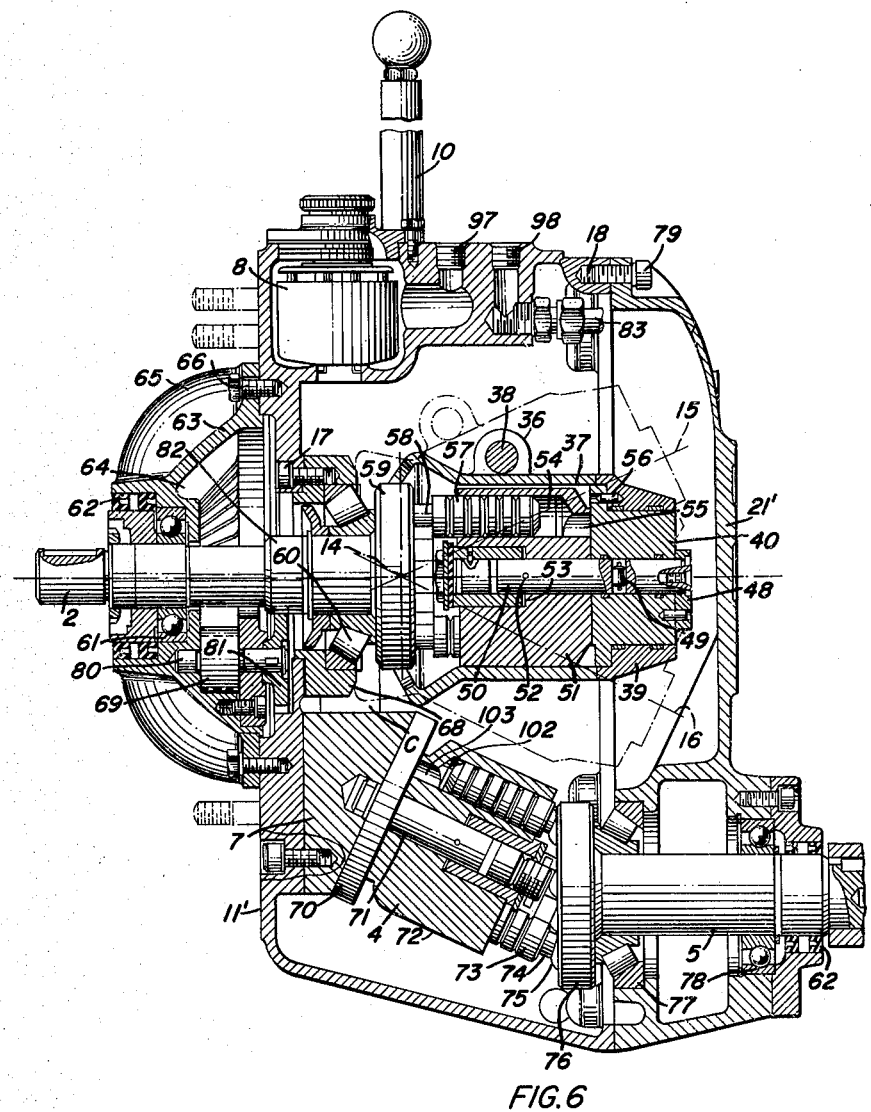
FIG. 6 is a sectional view through the transmission in the plane in which the driving and delivery shafts lie.

In the embodiment shown in FIGS. 5 and 6, the control pump 3 is driven by the drive shaft 2. Drive shaft 2 is mounted in a ball bearing 61 and in a tapered roller bearing 60 and is rigidly connected with a drive flange 59. In drive flange 59 are movably mounted piston rods 58, and on the piston rods 58 in turn pistons 57 are movably mounted. The pistons 57 slide in cylinders 54. The cylinders 54 are disposed in a cylinder drum 51, a port 55 being arranged in drum 51 for each cylinder 54. Drum 51 is mounted for rotation on trunnion 50. On the trunnion there is mounted, further, a control part 40 which is so connected with trunnion 50 by a locking member 48 that the two parts cannot rotate in relation to each other. The control part 40 in turn is mounted in a control part support 39 which is connected by screws 67 with the housing shell 37, a pin 56 preventing the control part 40 from rotating in relation to the control part support 39. In trunnion 50 there is provided, on the one hand, a reversing valve 49 and, on the other hand, bores 52 through which the annular space 53 is filled with oil under pressure, so that the pressure of the cylinder drum 51 prevailing in this annular space 53 presses against the control part 40, the reversing valve 49 serving to connect the pressure side of the control part 40 with the bores 52. The housing shell 37 is connected with two journals 89 which are pivotally mounted in the bearing blocks 91 and 92 through ball bearings 90. Through the journals 89 there lead oil lines, which are connected with the control part 40. In addition, two recesses almost representing a semicircular ring are provided, which recesses lie opposite the ports 55 and which, by conduits not shown in the drawing, are connected with conduits disposed in the journals 89, 89. The recesses in control part 40 are not visible in FIG. 6 because they do not extend through the sectional plane of that figure. The recess disposed in control part 40 behind the sectional plane of FIG. 6 is connected by means of a conduit not shown in the drawing with that journal 89 which is mounted in the bearing block 92, while the recess in the control part 40 lying in front of the sectional plane of FIG. 6 is connected with the conduit in that journal 89 which is mounted in the bearing block 91. The journals 89 are pivotable about the axis 14, so that the entire pump 3 is pivotable about the axis 14 to the positions 15 and 16 shown in dash-dot lines (FIG. 1). When pump 3 has been pivoted to position 15 shown in dash-dot lines and the drive shaft 2 is so rotated that it turns to the left as viewed in FIG. 6, during one-half revolution of the cylinder drum the pistons 57 are withdrawn from the particular cylinder 54 on the way from their highest to their lowest position with intake of oil through the respective port 55 of the control part 40 and the conduit in the bearing block 91 and accordingly they force this oil—during the succeeding half revolution—to the conduit in bearing block 92. The more the regulating pump 3 is swung out of the position shown in FIG. 6, the greater will be the stroke of the pistons with each revolution and accordingly the greater will be the delivery of the regulating pump 3 per second at constant speed of the drive shaft 2. In the pump position shown in FIG. 6, during rotation of drive shaft 2 the pistons 57 do not shift in the cylinders 54 and therefore no oil is delivered. If the regulating pump 3 is brought into position 16, shown in dash-dot lines, then oil is delivered from bearing block 92 to bearing block 91 by the regulating pump 3, during a drive in the aforementioned direction of rotation.

To bring about the pivoting of the regulating pump 3 about the horizontal axis 14, there is mounted in housing 1' in a boss 31 a journal 27 which is connected with a cranked lever 32. On journal 27 is further mounted a lever 10 which is provided with a sleeve 30, which by means of a fitted wedge 26 is mounted on journal 27 secured against rotation. Sleeve 30 is secured against displacements by a crown nut 28 and flat springs 29. Lever 10 is provided with an extension 100 which can be unscrewed for transportation. Also there is provided on lever 10 a bushing 86 in which a ball end 85 is mounted slidably and is supported by spring 87. The ball end 85 can be engaged in a ratchet eye 88, whereby lever 10 is retained in the position shown in the drawing. The cranked lever 32 terminates in two plane-parallel guides 33 whose median plane is arranged radially to the axis of journal 27. The axis of journal 27 is arranged parallel and in the vicinity of the extension of the axis of rotation 14. As the axis of rotation 14 is fixed by the two bearing blocks 91 and 92 and these in turn are connected with the front plate 11', which in turn is a part of the housing 1', it is very difficult to align the axis 14 with the axis of journal 27. Because of the chosen device for the pivoting of the regulating pump 3, an exact alignment of the two axes is not necessary. The housing shell 37 of the regualting pump 3, is provided with two bosses 36 in which a bolt 38 is displaceably mounted. Into bolt 38 a peg 101 is inserted in such a way that when peg 101 is inserted, bolt 38 is not displaceable in the direction which in FIG. 5 produces a displacement to the left. On bolt 38 is disposed a slide block 34 which is guided without play between the plane-parallel guides 33. A turning of lever 10 about journal 27 thus brings about by way of the cranked lever 32, the plane-parallel guide 33, the slide block 34, the bolt 38, and the bosses 36 a pivoting of the regulating pump 3. In this pivoting device no play is provided which would permit the regulating pump 3 to carry out—in the zero delivery position shown in the drawing—pivoted movements about this zero delivery position. On the other hand, by the ability of the slide block 34 to slide in the plane-parallel guides 33, and the ability of bolt 38 to rotate in the bosses 36, there is insured to the regulating pump 3 a coercion-free transmission of a force acting on the lever 10, producing the pivoting thereof. The conduit in journal 89 which leads into bearing block 92 is connected with conduit "C," and the conduit in journal 89 which is mounted in bearing block 91 is connected with conduit "D." Conduits "C" and "D" lead to the bearing block 7 on which engine 4 is mounted. Engine 4 is similarly constructed as the regulating pump 3, but is not pivotable so as to vary the piston stroke. Rather, there is arranged directly on the bearing block 7 the control surface 70, which has a similar function to that of the control part 40 of the regulating pump 3. In addition, there is provided a journal 71 about which a cylinder drum 72 can revolve, there being provided in the cylinder drum 72 cylinders 102 which are connected with ports 103 and in which pistons 73 are displaceable. The pistons 73 are mounted through piston rods 74 provided with ball ends 75, in the drive flange 76. This drive flange 76 is rigidly connected with the delivery shaft 5. The delivering shaft 5 is mounted by means of the tapered roller bearing 77 and the ball bearing 78 in the housing 1'. The oil line in bearing block 92 is further connected with the valve block 6 through a conduit 84. The valve block 6 is fastened on bearing block 91 by means of fastening screws 93. From bearing block 91 there extends, also, a bore connecting the conduit leading therethrough with the valve block 6. If the pressure in the conduit in bearing block 91 or in bearing block 92 exceeds a maximum permissible amount, an overpressure valve, not shown in the drawing, arranged in valve block 6, opens, and the oil discharging through the overpressure valve flows through conduit 83 to a connection member 98 which is connected with a conduit—not shown in the drawing—which leads to an oil cooler (likewise not shown in the drawing). From the oil cooler the oil, which has passed therethrough, is conducted through a conduit (not shown in the drawing) to the connecting pipe piece 97, which is connected directly with the oil filter 8. From the oil filter 8 the oil returns to the housing 1', which is filled with oil to about the upper edge of the valve block 6. The air filter 9 is fastened by a screw 104 in the housing 1' and serves at the same time as oil level rod, with which one can determine by extraction thereof to what height the housing 1' is filled with oil. The housing 1' is provided with an oil drain 94, with cooling ribs 95, a lifting eye 96, and feet 99. On the front plate 11' the bearing support block 68 is screwed with screws 17, the bearing support block 68 receiving the tapered roller bearing 60. The bearing support block 68 covers up in FIG. 6 the bearing block 92 and its attachment to the front plate 11'. In addition, the bearing bracket 63 is fastened to the front plate 11' by screws 66. On the bearing bracket 63 are provided outer cooling ribs 65 and inner cooling ribs 64, through which heat is transferred outward from the interior of the transmission. In the bearing bracket 63 the ball bearing 61 and packings 62 are provided. On the bearing gudgeon 80 is mounted a wheel of the gear pump 69, which is driven through the gear tooth system 82 of the drive shaft 2 and the gear 81 and forces oil in front of the particular suction side of the regulating pump 3 for compensation of the leakage losses.

The transmission cover 21' is connected by screws 79 with the housing 1', the transmission being shown in FIG. 5 without the tranmission cover 21'. The screws 79 are screwed into threaded holes 18.

It is to be understood that the delivery regulation of the pump is effected by variation of the lift height of the pistons, the lift height variation resulting from the fact that the pivoting of the pump results in an angle variation between the drive flange 59, operating on the wabble plate principle, and the axis of rotation of the cylinder drum 51.

From FIGS. 5 and 6 it should be clear that the valve block 6 is screwed to the bearing block 91 and that the latter is mounted on the front plate 11' of the gear case. The valve block 6 contains the pressure limiting valves, through which—on the one hand—oil is forced into the cycle to compensate leakage losses, and—on the other hand—when a highest permissible pressure is exceeded, excess oil is discharged to the oil cooler.

The gear case is amply filled with hydraulic fluid, namely, to about the upper edge of the control block 6. The working cycle of the hydraulic fluid runs from the regulating pump 3 through one of conduits C and D to the engine 4 and thence back through the other of conduits C and D to the regulating pump 3. Which of the two conduits C and D is the pressure line through which the hydraulic fluid flows from the regulating pump 3 to the engine 4 depends on the direction in which the regulating pump 3 is swung out of the "zero delivery position" shown in FIGS. 5 and 6. The mode of operation of the engine 4 is similar to that of the regulating pump 3 and is likewise evident from the description of the figures.

The ventilating fan means 13 blows air in the direction of the drive shaft 2 against the housing of the hydraulic transmission, so that the air sweeps the cooling ribs 95 and 65. It does not matter whether an axial blower is provided or a radial blower with adequate deflection of the air flow.

While in accordance with the provisions of the patent statutes we have illustrated and described the best forms and embodiments of the invention now known to us, it will be apparent to those skilled in the art that other changes and modifications may be made in the apparatus described without deviating from the invention as set forth in the following claim.

We claim:

In a hydrostatic energy converter transmission mechanism including a variable capacity axial piston pump having a swivelable pump body, a pump housing about said pump body and swivelable with the latter, and a driving shaft, said pump in its entirety being surrounded by a casing;

means for swiveling said housing and sand pump body of said axial piston pump as a unit, said swiveling means comprising, in combination, a pair of journals lying in one common axis and arranged on either side of said axial piston pump and between which journals said axial piston pump housing is journaled;

pivot means including a bolt member on said axial piston pump housing;

an operating journal pivotally mounted in said casing at least approximately coaxially to said pair of journals;

a cranked lever rotatably mounted in said operating journal and terminating in a pair of plane-parallel guides;

a slide block displaceably mounted between said pair of plane-parallel guides, said slide block operatively connecting said bolt member to said cranked lever;

said cranked lever being in this manner rotatably connected to said pivot means;

and an operating lever fixed to said operating journal and adapted to rotate said cranked lever and thereby to swivel said swivelable pump body, said slide block permitting slight displacement without the creation of significant tension.

References Cited by the Examiner

UNITED STATES PATENTS

| | | | |
|---|---|---|---|
| 1,137,283 | 4/15 | Pratt | 60—53 |
| 1,348,738 | 8/20 | Rayburn | 103—162 |
| 2,210,129 | 8/40 | Rose | 60—53 |
| 2,569,562 | 10/51 | Froebe | 60—53 |
| 2,662,375 | 12/53 | Postel et al. | 60—53 |
| 2,872,876 | 2/59 | Thoma | 103—173 |
| 2,967,395 | 1/61 | Foerster et al. | 60—53 |
| 2,975,720 | 3/61 | Schoellhammer | 103—162 |
| 3,108,543 | 10/63 | Gergor | 103—162 |

FOREIGN PATENTS

| | | |
|---|---|---|
| 142,313 | 7/51 | Australia. |
| 883,347 | 3/43 | France. |
| 974,089 | 9/60 | Germany. |
| 687,364 | 5/50 | Great Britain. |

LAURENCE V. EFNER, *Primary Examiner*.

SAMUEL LEVINE, JOSEPH H. BRANSON, Jr.,
*Examiners*.